UNITED STATES PATENT OFFICE.

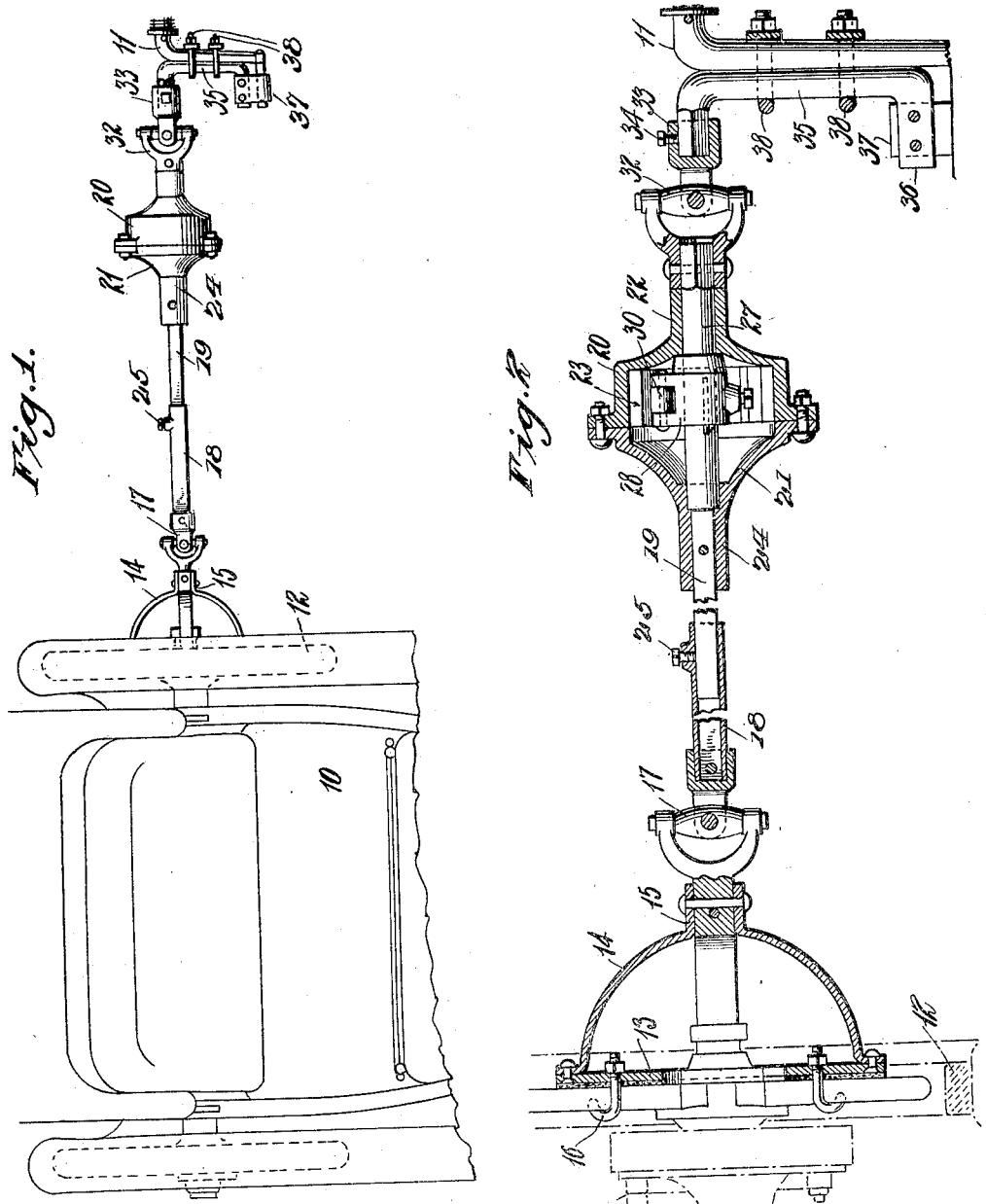

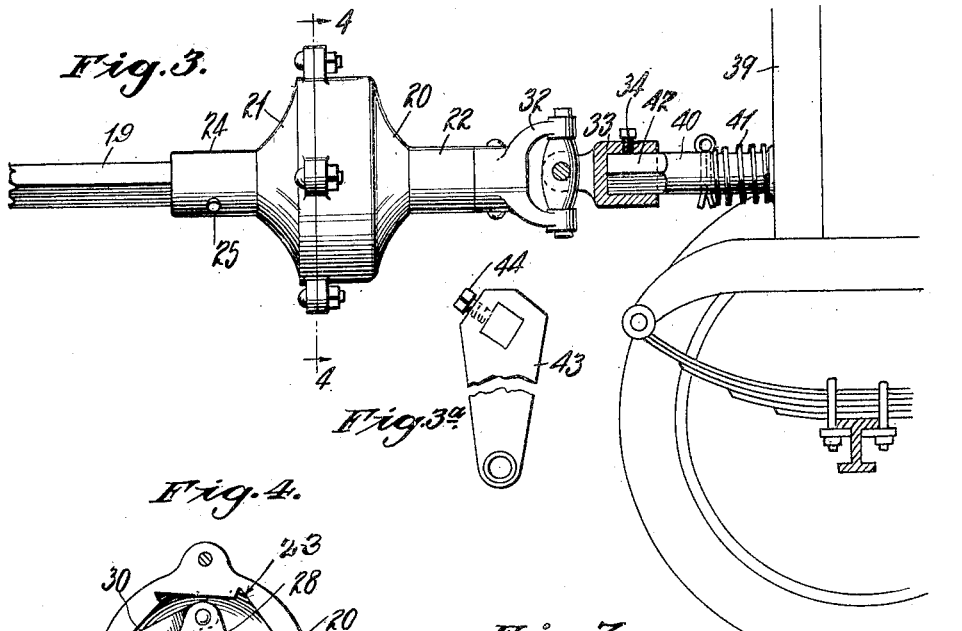

BLAINE H. SMITH AND JOHN C. WARNER, OF TONKAWA, OKLAHOMA.

CRANKING DEVICE FOR INTERNAL-COMBUSTION ENGINES.

1,375,117. Specification of Letters Patent. Patented Apr. 19, 1921.

Application filed June 29, 1920. Serial No. 392,859.

*To all whom it may concern:*

Be it known that we, BLAINE H. SMITH and JOHN C. WARNER, citizens of the United States, residing at Tonkawa, in the county of Kay and State of Oklahoma, have invented certain new and useful Improvements in Cranking Devices for Internal-Combustion Engines, of which the following is a specification.

This invention relates to an improved cranking device for motor vehicle engines and has as one of its principal objects to provide a device of this character whereby the motive power of one motor vehicle may be directly employed for cranking the engine of another motor vehicle and thus starting the engine of the latter vehicle.

The invention has as a further object to provide a device of this character which may also be employed for burning in the bearings of a motor vehicle engine by continuous cranking of the engine by another motor vehicle.

And the invention has as a still further object to provide a device which may be readily applied and which may be employed in connection with substantially any conventional design of motor vehicle.

Other and incidental objects will appear hereinafter.

In the drawings:

Figure 1 is a plan view showing our improved device in position upon one rear wheel of one motor vehicle and engaging the crank of the engine of another motor vehicle, Fig. 2 is a sectional view of the device on a somewhat enlarged scale, Fig. 3 is a side elevation showing the device connected directly to the cranking stub shaft of a motor vehicle engine, Fig. 3ª is a detail elevation showing a crank for use in connection with the stub shaft illustrated in Fig. 3, Fig. 4 is a view particularly illustrating the ratchet of the device, Fig. 5 is a fragmentary sectional view of one section of the ratchet casing, Fig. 6 is a fragmentary sectional view showing a slight modification, Fig. 7 is a section taken on the line 7—7 of Fig. 6, and Fig. 8 is a section taken on the line 8—8 of Fig. 6.

In order that the construction, mounting and operation of our improved device may be accurately understood, we have, in the drawings, shown the device in connection with a motor vehicle 10 of conventional design as well as in connection with the crank 11 of another motor vehicle of ordinary construction, the latter vehicle not being shown, however. One rear wheel of the vehicle 10 is indicated at 12. At this point it may be stated that the present device is particularly designed for use in cranking Ford tractors. However, we do not wish to be limited in this regard since, as will be perceived as the description proceeds, the device may be readily employed for general use in cranking motor vehicle engines or for burning in the bearings of an engine by continuously cranking the engine.

In carrying the invention into effect, we employ a drive head which includes an annulus 13 to which is connected a spider 14 forming a sleeve 15. As best shown in Fig. 2, the annulus 13 is seated against the spokes of the wheel 12 of the vehicle 10 so that the spider 14 overlies the hub of the wheel extending at the outer side thereof and freely fitted through the annulus is a plurality of hook bolts 16 engaged with the spokes of the wheel for firmly connecting the drive head to the wheel to turn therewith. The drive head is preferably connected to the left rear wheel of the vehicle 10, which is suitably lifted out of engagement with the ground, while the other rear wheel of the vehicle is blocked so as to be held against turning movement. Fixed in the sleeve 15 of the spider 14 is one element of a universal joint 17 and rigidly connected to the other element of said joint is the tubular section 18 of a drive shaft. Telescoping in the section 18 is the solid section 19 of said shaft and threaded through the first section to impinge the latter section is a locking screw 25 securing the sections in lineally adjusted position.

A ratchet is employed. This ratchet includes a casing which is formed of sections indicated for convenience at 20 and 21 respectively, these sections being provided with mating ears through which are engaged bolts or other suitable fastening devices firmly securing the sections together. The section 20 is formed axially with a bearing sleeve 22 and is provided internally with an annular series of ratchet teeth 23.

Formed axially on the section 21 is a sleeve 24 squared at its outer end portion, as particularly shown in Fig. 5, to receive the adjacent end of the section 19 of the drive shaft and engaged through said sleeve and through the shaft section is a suitable locking pin rigidly connecting the ratchet casing with the drive shaft. At its inner end portion the sleeve 24 is formed with a bearing 26 and freely fitted through the sleeve 22 of the casing section 20 to fit in said bearing is a driven shaft 27. Fixed upon this shaft within the ratchet casing is a ratchet head 28 provided with a radial lug 29 and pivoted upon said head is a ratchet dog or pawl 30 held to coöperate with the ratchet teeth 23 by a spring 31 bearing between the pawl and the lug 29. Thus, as will be seen, rotation of the drive shaft 18 will operate through the ratchet to turn the driven shaft 27. At the same time, the driven shaft may turn independently of the drive shaft. Fixed to the outer end of the driven shaft is one element of a universal joint 32, the other element of which is provided with a squared socket or sleeve 33 carrying a set bolt 34. Removably engaged in this socket to be held by the set bolt is the upper end of a crank 35 provided at its lower end with a laterally and inwardly directed terminal 36. As will be noted, the crank 34 is arranged to abut the crank 11 so that the terminal 36 of the former crank confronts the handle of the latter crank and fixed to the terminal 36 is a plate 37 engaging said handle. Embracing the cranks are spaced U-bolts or other approved fastening devices 38 coöperating with the plate 37 for coupling the cranks to turn in unison.

In the practical use of the device, the vehicle 10 is first driven to a position in front of the vehicle carrying the engine crank 11, as suggested in Fig. 1, when the left rear wheel of the first vehicle is jacked up and the right rear wheel of this vehicle blocked. The drive head of the device is then connected to the wheel 12 while the crank 33 is engaged with the crank 11. In thus engaging the crank 35 with the crank 11, the set bolt 25 should be loosened in order that the crank 11 may be moved inwardly against the spring tension thereon into engagement with the engine crank shaft. In this connection it is to be noted that the adjustment provided by the telescopic shaft sections 18 and 19 will eliminate the necessity of stopping the vehicle 10 any set distance in front of the other vehicle. By again tightening the set bolt, the crank 11 will be held in engagement with said shaft while the universal joints 17 and 32 will compensate for any difference in alinement between the hub of the wheel 12 and the axis of the crank 11 as well as any difference in the elevation of these parts. Consequently, when the engine of the vehicle 10 is started, the device will act to rotate the crank 11 and accordingly crank the engine of the other vehicle. This may, of course, be continued until the engine of the latter vehicle starts running. Any difference in the speed of rotation of the crank 11 and the speed of rotation of the wheel 12 will then be compensated for by the ratchet of the device while, when the motive power of the vehicle 10 is disconnected from the wheel 12 and this wheel is stopped, the ratchet will permit the continued turning of the crank. Therefore, after the wheel 12 has stopped, the set bolt 25 may be readily released and the crank 11 moved outwardly out of engagement with the engine crank shaft when the device may be dismounted.

In Figs. 3 and 3ª of the drawings, we have shown the provision of a special type of stub shaft and crank for motor vehicles whereby the present device may, without the use of the crank 34, be readily employed in connection with a vehicle so equipped. In these figures, a motor vehicle is conventionally illustrated at 39 and suitably journaled upon the vehicle to project forwardly therefrom is a cranking stub shaft 40 provided at its inner end with any approved means for engagement with the forward end of the crank shaft of the vehicle engine and normally held away from said shaft by a suitable spring 41. At its outer end the stub shaft 40 is formed with a squared terminal 42 over which is fitted a crank 43 detachably connected to the shaft by a set bolt 44. The terminal 42 is of a size to be freely received within the sleeve 33 of the present device so that, as shown in Fig. 3, by removing the crank, the sleeve may be readily engaged over said terminal for cranking the engine of the vehicle.

In Figs. 6, 7 and 8 of the drawings, we have shown the provision of a coupling for use in connection with the present device whereby said device may be employed in conjunction with vehicles already equipped with removable cranks. The cranking stub shaft of such a vehicle is shown at 45, this shaft being provided at its outer end with a reduced terminal 46 for receiving a crank. Engageable at one end over this terminal is a sleeve 47 connected to the terminal by a set bolt 48 and fitted in the opposite end of said sleeve is a stub shaft 49 held by a set bolt 50. At its outer end the stub shaft is provided with a squared terminal 51 engageable in the sleeve 33 of the present device. Thus, by the use of this coupling, the stub shaft 45 may be readily rotated. As will be perceived, the sleeve 47 is removably fitted upon the stub shaft 49 so that different sleeves may be employed in connection with said stub shaft to meet the requirements of different cranking stub shafts.

Having thus described the invention, what is claimed as new is:

1. A device of the character described including a drive shaft, a driven shaft, a ratchet casing fixed to the drive shaft and having the driven shaft journaled therein, a ratchet housed within said casing forming an operative connection between the shafts, and means for operatively connecting the driven shaft with an engine crank shaft.

2. A device of the character described including a drive shaft, means for connecting said shaft with a vehicle wheel, a driven shaft, a ratchet casing fixed upon the drive shaft and having the driven shaft journaled therein, a ratchet mounted within said ratchet casing and forming an operative connection between the shafts, and means for operatively connecting the driven shaft with an engine crank shaft.

3. A device of the character described including a drive shaft, a driven shaft, a ratchet casing fixed to the drive shaft and having alined bearings journaling the driven shaft, a ratchet housed by said casing and forming an operative connection between the shafts, and means for operatively connecting the driven shaft with an engine crank shaft.

4. A device of the character described including a drive head provided with an annulus having a spider extending therefrom, means for connecting said annulus to a vehicle wheel seating against the spokes of the wheel and having the spider extending over the wheel hub, a drive shaft operatively connected with said spider, a driven shaft, a ratchet connection between said shafts, and means for operatively connecting the driven shaft with an engine crank shaft.

5. A device of the character described including a ratchet casing, a lineally adjustable drive shaft fixed thereto for rotating the casing, a driven shaft journaled by the casing, a ratchet within the casing forming an operative connection between said shafts, and means for operatively connecting the driven shaft with an engine crank shaft.

6. A device of the character described including a ratchet casing formed of mating sections rigidly connected, a drive shaft fixed to one of said sections, a driven shaft extending from another of the sections and journaled thereon, a ratchet within the casing forming an operative connection between the shafts, and means for operatively connecting the driven shaft with an engine crank shaft.

7. A device of the character described including a drive shaft, a ratchet casing fixed thereon and provided internally with ratchet teeth, a driven shaft journaled upon the casing, a head fixed to the driven shaft within the casing, a spring pressed pawl pivoted upon the head to coact with said teeth, and means for operatively connecting the driven shaft with an engine crank shaft.

In testimony whereof we affix our signatures.

BLAINE H. SMITH. [L. S.]
JOHN C. WARNER. [L. S.]